United States Patent Office 3,187,301
Patented June 1, 1965

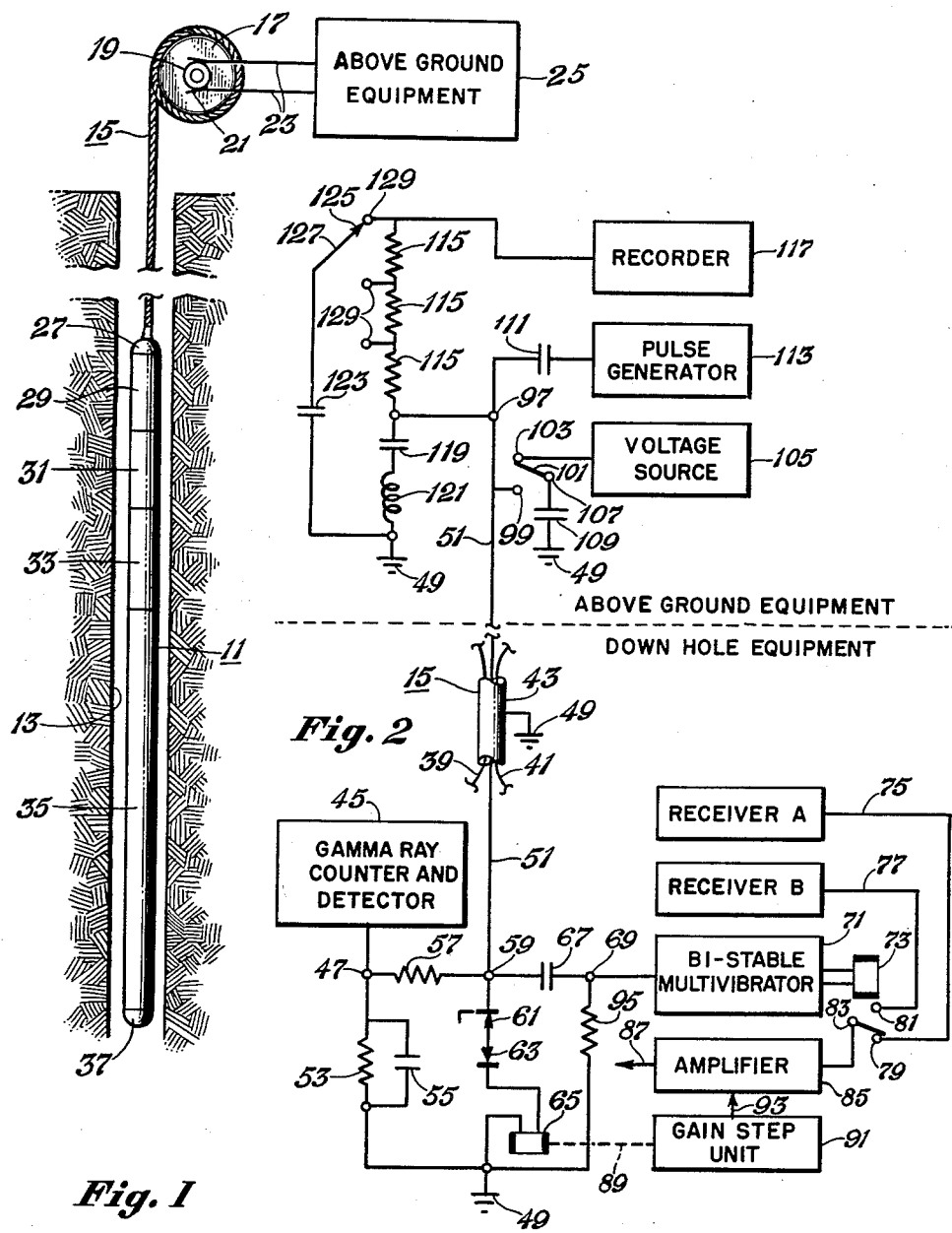

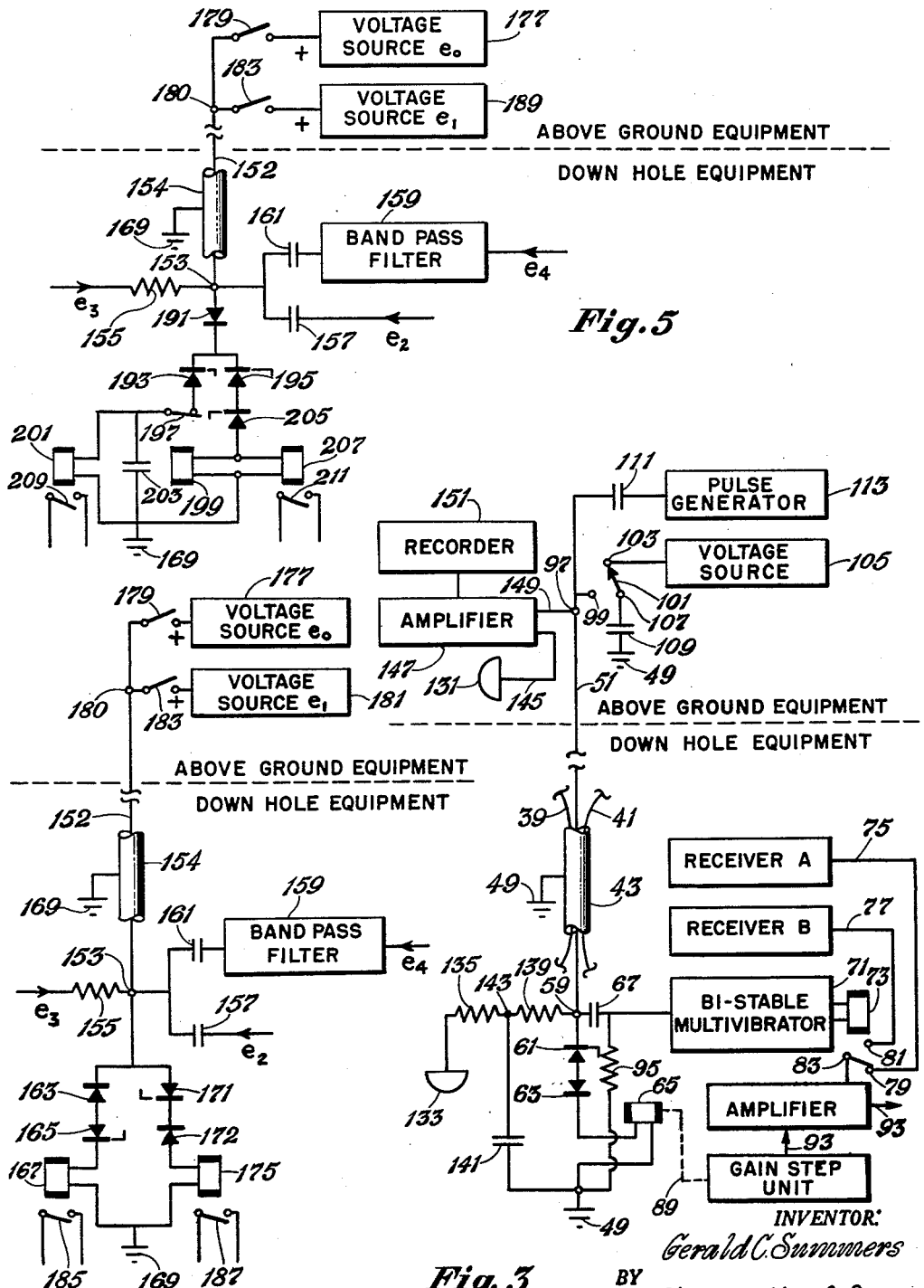

3,187,301
TELEMETERING SYSTEM FOR USE IN BOREHOLE LOGGING TO CONTROL DOWNHOLE TOOL FROM SURFACE
Gerald C. Summers, Dallas, Tex., assignor, by mesne assignments, to PGAC Development Company, Houston, Tex., a corporation of Texas
Filed June 5, 1959, Ser. No. 818,374
27 Claims. (Cl. 340—18)

My invention relates to telemetering and remote control devices and systems, and more particularly to apparatus, techniques, and arrangements enabling transmission of additional signals over a single channel of a system utilizing wire cable conductors.

My invention will be herein described and illustrated as applied to borehole logging as practiced in the petroleum industry, though it is by no means limited to such applications.

In the field of borehole logging, electric signals are usually transmitted over a cable which is also used to lower the logging tool into the borehole. Such cable is made up of one or more conductors surrounded by two layers of counter wound steel armor which may be used as a return path for electric signals. The cable inner conductors are not shielded relative to each other, or the armor, and they are not transposed. In brief, a borehole logging cable in general provides electric signal transmission channels of poor high frequency response. Additionally, the more cable conductors, the greater the bulk, weight, and cost of the cable. This can be quite important since it is not unusual for cable lengths to run as much as 10,000 feet and more. Thus, in order to obtain the most convenient, effective, reliable, and economical results, the borehole logging operator will choose equipment designed to require use of the smallest possible number of cable conductors without making associated equipment unduly complex.

It is accordingly an object of my invention to provide apparatus, techniques, and arrangements which will allow transmission of more signal information over a given number of conductors.

Another object of my invention is to provide apparatus, techniques and arrangements which will allow use of fewer cable conductors for transmission of a given set of signal functions in a borehole logging system, without use of unduly complex associated equipment.

Another object of my invention is to provide apparatus, techniques, and arrangements which will make possible the transmission of additional signal functions on a single pair of cable conductors in a borehole logging system.

Another object of my invention is to provide apparatus, techniques, and arrangements which will permit use of smaller, more economical cable for a given borehole logging operation, without making associated equipment unduly complex.

These and other objects are effected by my invention as will be apparent from the following description, taken in accordance with the accompanying drawings, forming a part of this application, in which:

FIG. 1 is a diagrammatic showing of the general layout of a borehole logging system in which my invention may be utilized;

FIG. 2 is a schematic circuit diagram illustrating use of my invention in a borehole logging system;

FIG. 3 is a schematic circuit diagram illustrating use of my invention in another borehole logging system;

FIG. 4 is a schematic circuit diagram showing a modification of the invention; and FIG. 5 is a schematic circuit diagram showing another modification of the invention.

Referring now to the drawings, there is shown in FIG. 1 a logging instrument assembly 11 lowered into a borehole 13 by means of a cable 15 which is reeled off a conventional cable drum 17 which is powered and controlled by conventional means (not shown). The cable 15, in addition to supoprting the instrument assembly, has a plurality of conductors, insulated from each other and from the outer sheath. The cable drum shaft is provided with a plurality of slip rings 19, with associated brushes 21, through which electric signals are transmitted to or from the cable conductors and via suitable conductors 23 to components of conventional above-ground equipment 25 indicated in block form.

The sections of the downhole instrument assembly 11 as shown by FIG. 1 may include, by way of illustration, reading from top to bottom, a cable head 27, an amplifier and control section 29, an acoustic energy transmitter 31, a gamma ray detector and counter 33, an acoustic receiver section 35, and a nose piece 37. The components of the downhole instrument assembly are each built into a length of heavy pipe provided with threaded coupling devices at its ends, as well as suitable electric connector devices. The cable 15 is fixed at its lower end to the cable head 27 which is coupled at its lower end to the uppermost instrument component 29.

In FIG. 2 the invention is shown as employed in a borehole logging system wherein it is desired to measure acoustic velocity and natural gamma ray radioactivity of the earth formations traversed by the instrument assembly simultaneously, using a three conductor plus armor cable. The first two cable conductors 39, 41 are associated with conventional components of the system which are not essential to the explanation of the present invention, and so the connections of those conductors and the associated components, for the sake of simplicity, have not been shown. Suffice it to say that power at 60 c.p.s. is sent down the cable by using the first two cable conductors in parallel for the high side, and the armor 43 as the return. Synchronization and signal information are phantomed between the same cable conductors by use of a center tapped transformer at each end of the cable.

Since the frequency components of velocity logging signals are within the same range as the output of a gamma ray detector would be, it is necessary to count the gamma radiation downhole and convert it to a varying D.C. voltage of magnitude proportional to radiation count. This function is performed in a conventional manner by Gamma Ray Counter and Detector, shown as block 45. Thus the voltage appearing at terminal 47, or between the output of the detector 45 and ground at 49, varies from about 3 to 13 volts, D.C., and this voltage must be read accurately and unchanged above-ground and recorded as a gamma ray log. This signal, sometimes herein called the radiation count signal, is to be transmitted to the above-ground equipment via the third cable conductor 51 sometimes herein called the conductor three and the armor 43, sometimes herein called the return conductor. Another function to be transmitted to the downhole equipment via conductor three 51 and the return conductor 43 is the receiver switching pulse signal, which will be hereinafter more fully explained. Still another function to be transmitted to the downhole equipment is the gain-step signal, also to be hereinafter more fully explained.

Considering now the components and circuit connections shown in FIG. 2, a first resistor 53 shunted by a first capacitor 55 is connected between the detector output terminal 47 and ground 49. A second resistor 57 is connected between the detector output terminal 47 and the downhole terminal 59 of conductor three 51. The downhole terminal 59 of conductor three is also connected to the cathode of a first semi-conductor diode 61 which has its anode connected to the anode of a second semi-conductor diode 63, the cathode of which is connected in series with the coil of a gain stepping relay 65 to ground at 49. The downhole terminal 59 of conductor three 51 is also connected in series with a second capacitor 67 to the input terminal 69 of a Bi-stable Multivibrator 71, the output of which is connected to the coil of a receiver switching relay 73. Velocity logging receivers A and B have their outputs connected respectively via conductors 75 and 77 to the switched contacts 79, 81 of the receiver switching relay 73, which has its common terminal 83 connected to the input of an amplifier 85, the output 87 of which is connected via means not shown to appropriate above ground equipment (not shown). The armature of the gain step relay 65 is mechanically connected via a linkage 89 to a conventional gain step unit 91 which is connected via lead 93 to the amplifier 85. A third resistor 95 is connected between the input terminal 69 of the multivibrator 71 and ground at 49.

The above ground terminal 97 of conductor three 51 is connected to one fixed contact 99 of a single pole double throw switch 101, the other fixed contact 103 of which is connected to a direct current voltage source 105, and the movable contact 107, of which is connected in series with a third capacitor 109 to ground at 49. The above-ground terminal 97 of conductor three 51 is also connected in series with a fourth capacitor 111 to the output of a pulse generator 113. In addition, the above-ground terminal 97 of conductor three 51 is connected in series with a plurality of resistors 115 to the input of a conventional recorder 117, and also in series with a fifth capacitor 119 and an inductance 121 to ground at 49. A sixth capacitor 123 has one terminal connected to ground at 49 and the other terminal connected to the movable contact 125 of a selector switch 127, the fixed contacts 129 of which are connected to respective end terminals of said plurality of resistors 115.

Cable conductor three 51 has a large component of 60 c.p.s. voltage impressed on it due to capacitive coupling with respect to the first and second cable conductors 39, 41. The combination of the second resistor 57 and first capacitor 55 attenuate this voltage so that it will not be rectified by non-linear action of the Detector 45 to create a false component of direct current between conductor three 51 and ground 49. As will be hereinafter more fully explained, the diodes 61, 63 will not conduct unless the voltage applied at conductor three downhole terminal 59 exceeds a predetermined positive or negative magnitude. The impressed direct current component above-mentioned normally will not exceed either magnitude. The combination of the fifth capacitor 119 and the inductance 121 are made series resonant at 60 c.p.s. to reduce the said impressed direct current component. Since the resistance of conductor three 51 may in practice be as high as 400 ohms, it is conceivable that in some cases, 60 c.p.s. rejection filters at both ends would be required.

Because of the limited number of counts obtained in logging natural gamma radiation, the speed of logging and the time constant is varied at the above-ground location. Thus, the Detector output voltage, which appears at the downhole terminal 59 of conductor three 51 as a varying direct current voltage proportional to gamma ray count, is fed via conductor three to the above-ground location and via a time constant network including the sixth capacitor 123, the plurality of resistors 115, and the selector switch 127, to the recorder 117.

The pulse generator 113 functions to produce pulses which are about 40 volts positive, having about 100 microseconds' rise time and 500 microseconds' fall time, at the rate of about 20 pulses per second. Since these pulses are capacitively coupled to conductor three 51 at the surface by the fourth capacitor 111, and are capacitively coupled downhole to the multivibrator 71 by the second capacitor 67, and because of their short duration, they introduce no direct current component between conductor three 51 and ground 49. Also, the magnitude of these pulses is less than that required for conduction of the diodes 61, 63.

The purpose and function of the diodes 61, 63 will now be considered in more detail. It is a characteristic of semi-conductor diodes that they will conduct heavily when the anode is made slightly positive with respect to the cathode. Another characteristic is that a small, but relatively voltage-insensitive, current flows when the anode is made negative with respect to the cathode, within certain limits. A further, less well-known characteristic of semi-conductor diodes is that if a certain critical voltage in the backward direction is exceeded, the device again becomes a heavy conductor. This latter characteristic is popularly known as the "Zener" effect. Actually in most such diodes the effect is an avalanche of carriers rather than the true "Zener" field effect, and yet the term "Zener" is popularly applied to any semi-conductor diode where the avalanche voltage is controlled in its manufacture and utilized in its application, and the term "Zener" as used herein, is used in the popular sense.

Many types of semi-conductor diodes are commercially available, and the types actually used will, of course, depend on requirements of the particular application. By way of example, for the specific embodiment as shown by FIG. 2, a suitable first diode 61 is the Hoffman 1N1469, which is a "Zener" diode of 58 volts plus or minus 10% reverse breakdown value, and a suitable second diode 63 is the Sarkes-Tarzian 40K which has about 400 volts reverse breakdown value and is designed only for rectifier service.

As has already been explained, neither the varying direct current voltage proportional to gamma ray count, nor the pulses which trigger the multivibrator 71 are adversely affected by the presence of the first and second diodes 61, 63. As hereinbefore mentioned, the third function to be transmitted on conductor three 51 is the gain step signal. The movable contact of the single pole double throw switch 101 is normally closed toward the direct current voltage source 105, which charges the third or storage capacitor 109 to about 270 volts positive. Then the switch 101 is closed to the other fixed contact 99, the storage capacitor 109 is discharged onto conductor three 51, causing a direct current pulse in excess of 58 volts positive to appear at the downhole terminal 59 of conductor three 51, so that the first, or "Zener" diode 61 breaks down and passes operating current in its reverse direction, which current passes through the second diode 63 in its forward direction, and operates the gain-step relay 65 which in turn actuates the gain-step unit 91 to change the gain of the amplifier 85. The range 58 volts positive to 400 volts negative is thus effectively a "window" through which relatively high impedance phenomena may be passed with none of the adverse loading effects of the gain stepping relay 65 or other low impedance devices until such devices are needed, at which time a temporary interruption of other measurements can be tolerated. The gain-step function in the instant case does momentarily interrupt the other measurements, but this function need be performed only occasionally.

If desired, the gain-stepping relay 65 could be used to control the gamma ray counting rate instead of the amplifier gain. Also, a second stepping relay (not shown) could be used to control gamma ray count, and another relay (not shown) operated by 60 c.p.s. power taken from the first and second conductors 39, 41 and ground 49 could be used to select the relay to be stepped upon discharge of the third capacitor 109. The 60 c.p.s. power would be turned off above-ground when it was desired to select a counting rate change. This, of course, would interrupt other measurements, and would normally be done while the borehole instrument assembly 11 is not moving.

Another embodiment of my invention is shown by FIG. 3, in which formation acoustic velocity and electrical self-potential are measured simultaneously utilizing a cable having three conductors plus armor. Most of the components and circuit connections of FIG. 3 are identical to those of FIG. 2, and these are assigned the same reference numerals as corresponding parts of FIG. 2. To avoid repetition, only those components and connections of FIG. 3 which do not appear in FIG. 2 will now be described. The formation self-potential is a small direct current voltage, of the order of tenths or hundredths of a volt, measured between a first electrode 131 at aboveground level (usually in the drilling mud pit) and a second electrode 133 which is carried by the borehole instrument assembly; usually it is the nose piece 37 of FIG. 1. The second electrode 133 is connected in series with fourth and fifth resistors 135, 139 to the downhole terminal 59 of conductor three 51. A seventh capacitor 141 is connected between the junction 143 of the fourth and fifth resistors 135, 139 and ground 49. The first electrode 131 is connected via lead in 145 series with the input terminals of a second amplifier 147 and via lead 149 to the above-ground terminal 99 of conductor three 51. The output of the second amplifier 147 is connected to a recorder 151. The formation self-potential which appears at the junction 143 of the fourth and fifth resistors 135, 139, is a small direct current potential which will vary slowly with borehole instrument assembly depth. The combination of the fifth resistor 139 and the seventh capacitor 141 provide isolation to prevent 60 c.p.s. voltage impressed on conductor three 51 and other pulse and alternating voltages from being applied to the second electrode 133 where non-linearity might cause rectification and insert an undesired direct current component large enough to mask the small self-potential being measured. The fourth resistor 135 in combination with the shunt capacitance of the electrode 133 itself further attenuates these alternating and pulse voltages. The self-potential voltage between the first and second electrodes 131, 133 is amplified and then recorded as a self-potential log. Measurement of self-potential is not adversely affected by the presence of the first and second diodes 61, 63. The functions and operation of the other portions of FIG. 3 are the same as for the corresponding portions of FIG. 2 which have been hereinbefore described.

In FIG. 4 there is shown an embodiment of the invention wherein five separate signal functions are transmitted over a cable having only a single conductor 152 plus armor 154. Three of these signal functions are transmitted from downhole to above ground equipment (not shown), while the other two signal functions are transmitted from above ground to operate respective downhole relays. The first signal function is a low level direct current voltage $e_3$, which is impressed on the downhole cable terminal 153 through a series resistor 155. The second signal function is a low level pulse voltage $e_2$, which is coupled to the downhole cable terminal 153 by a capacitor 157. The third signal function is a band of low level alternating frequency signals $e_4$ which are applied through a band pass filter 159 and a coupling capacitor 161 to the downhole cable terminal 153. A first diode 163 has its cathode connected to the downhole cable terminal 153 and its anode connected to the anode of a second diode 165 which has its cathode connected in series with the coil of a first relay 167 to ground 169. A third diode 171 has its anode connected to the cable downhole terminal 153 and its cathode connected to the cathode of a fourth diode 172 which has its anode connected in series with the coil of a second relay 175 to ground 169. The fourth signal function is a large voltage pulse $e_0$ in excess of 58 volts positive, and derived from a source 177 which is connected through a first single pole switch 179 to the above-ground cable terminal 180. The fifth signal function is a large negative pulse $e_1$ in excess of 58 volts negative, and derived from a source 181 which is connected through a second single pole switch 183 to the above-ground cable terminal 180. The second and third diodes 165, 171 are "Zener" diodes which will conduct heavily in the backward direction upon application of reverse voltage in excess of 58 volts.

These diodes may be Hoffman type 1N1469. The first and fourth diodes 163, 173 are diodes designed only for rectifier service having about 400 volts reverse breakdown, and may be Sarkes-Tarzian type 40K. The first, second, and third signal functions are not adversely affected by the presence of the diodes because none of these functions exceed 58 volts positive or negative. The contacts 185, 187 of the first and second relays 167, 175 may perform any desired downhole function wherein momentary interruption of measurements can be tolerated. For example, one relay could operate a stepping switch to change acoustic velocity amplifier gain, and the other relay could operate another stepping switch to change the gamma ray count rate. The first relay 167 will operate upon application of a negative direct current pulse in excess of 58 volts derived from voltage source $e_1$ upon closure of the associated single pole switch 183. The second relay 175 will operate upon application of a positive direct current pulse in excess of 58 volts derived from voltage source $e_0$ upon closure of the associated single pole switch 179. The first and fourth diodes 163, 173, as in the case of FIGS. 2 and 3, function to preclude rectification by the "Zener" diodes when driven into forward conduction.

In FIG. 5 there is shown an embodiment of the invention wherein "Zener" diodes are used to make possible the operation of more than two high level current functions at different levels. Except for the diode and relay arrangement, and the nature of voltage source $e_1$, the components and circuit connections of FIG. 5 are identical to those of FIG. 4 and are assigned the same reference numerals. To avoid repetition, only those components and circuits of FIG. 5 which are different from FIG. 4 will now be described. From voltage source $e_1$ 189 of FIG. 5, there is derived upon closure of the associated switch 183, a direct current pulse in excess of twice 58 volts positive. In FIG. 5, a first diode 191 has its anode connected to the downhole cable terminal 153 and its cathode connected to the cathodes of second and third diodes 193, 195. The anode of the second diode 193 is connected in series with the normally closed contacts 197 of a second relay 199 and the coil of a first relay 201 to ground 169. The coil of the first relay 201 is shunted by a time delay capacitor 203. The anode of the third diode is connected to the cathode of a fourth diode 205, the anode of which is connected through the parallel coils of the second relay 199 and a third relay 207 to ground 169. The contacts 209, 211 of the first and third relays may be used to perform any desired downhole operation wherein momentary interruption of measurements can be tolerated. These relays 201, 207 would normally be used to operate stepping switches. The first diode 191 is a type designed for rectifier service only, for example a Sarkes-Tarzian type 40K of about 400 volts reverse breakdown. The second, third, and fourth diodes 193, 195, 205 are "Zener" diodes, for example, Hoffman type 1N1469, having about 58 volts reverse breakdown.

When the switch 179 associated with voltage source $e_0$ is closed, a direct current pulse in excess of 58 volts positive, but less than 116 volts, is applied to the downhole cable terminal 153. This pulse is conducted by the first diode 191 in its forward direction and by the second diode 193 in its reverse direction, through the normally closed contacts 197 of the second relay 199 and the coil of the first relay 201, thus energizing the first relay. When the switch 183 associated with voltage source $e_1$ 189 is closed, a direct current pulse in excess of 116 volts positive is applied to the downhole cable terminal 153. This pulse is conducted by the first diode 191 in its forward direction, and by the second diode 193 in its reverse direction, and by the series combination of the third and fourth diodes 195, 205 in their reverse direction and through the coils of the second and third relays 199, 207 to ground 169. Thus the third relay 207 is energized to perform its downhole function. The value of the time delay capacitor 203 shunting the coil of the first relay 201 is chosen so that the contacts 197 of the second relay 199 are opened before there is sufficient voltage on the coil of the first relay 201 to cause its operation. Thus the first relay 201 operates only upon application of a pulse from voltage source $e_0$ 177, and the third relay operates only upon application of a pulse from voltage source $e_1$ 189. Instead of using two diodes 195, 205 in series to obtain the higher "Zener" voltage, a single diode having sufficiently high "Zener" voltage could be used.

From the foregoing it will be apparent that I have disclosed several arrangements wherein "Zener" diodes are utilized to make possible the performance of more functions using fewer conductors, by transmission of signals over a single conductor pair, creating a "window" through which relatively high impedance phenomena may be passed with no adverse loading effects of low impedance devices until such devices are needed, at which time a temporary interruption of high impedance phenomena can be tolerated. If desired, a "window" not including zero could be created by using a direct current biasing voltage of some value between zero and the "Zener" or avalanche voltage and a single semiconductor operates only upon application of a pulse from voltage source $e_1$ 189. Instead of using two diodes 195, 205 in series to obtain the higher "Zener" voltage, a single diode having sufficiently high "Zener" voltage could be used.

From the foregoing it will be apparent that I have disclosed several arrangements wherein "Zener" diodes are utilized to make possible the performance of more functions using fewer conductors, by transmission of signals over a single diode. All low level functions would then be biased the same amount.

While I have shown my invention in several forms, it will be obvious to those skilled in the art that it is not so limited, but is susceptible of various changes and modifications without departing from the spirit thereof.

I claim:

1. In a borehole logging system wherein a plurality of relatively low signal level functions are to be transmitted between above ground equipment and a borehole instrument assembly, and one or more low impedance devices are to be operated downhole at occasional intervals in response to signals from above ground equipment; the combination comprising, a cable conductor and a ground return, a first terminal at the above ground end portion of said conductor, a second terminal at the downhole end portion of said conductor, means for applying a plurality of relatively low level signals between said second terminal and the ground return, a first "Zener" diode, a second semiconductor diode, means connecting the cathode of said first diode to said second terminal and for connecting the anode of said first diode to the anode of said second diode, a low impedance device connected between the cathode of said second diode and said ground return, said "Zener" diode having a predetermined reverse breakdown voltage, and said second diode having a predetermined reverse breakdown voltage, above ground means for generating a direct current pulse of positive polarity and of voltage magnitude greater than the reverse breakdown voltage of said "Zener" diode, and means for selectively applying said pulse to said second terminal to energize said low impedance device.

2. In a telemetering and remote control system wherein a plurality of relatively low signal level functions are to be transmitted between a first station and a second station, and one or more low impedance devices at the second station are to be operated at occasional intervals in response to signals from the first station, the combination comprising a first conductor connecting said stations and a return path, means for applying one or more low level signals between said conductor and the return path at said second station, first "Zener" diode having one terminal connected to said conductor at said second station, a second semiconductor diode, means connecting the other terminal of first diode to the like polarity terminal of said second diode, a low impedance device connected between the free terminal of said second diode and said return path, said "Zener" diode having a predetermined reverse breakdown voltage, and said second diode having a predetermined reverse breakdown voltage, means at said first station for generating a direct current pulse of voltage magnitude greater than the reverse breakdown voltage of said "Zener" diode and of polarity opposite to the polarity of the "Zener" diode terminal which is connected to said conductor, and means for selectively applying said pulse to said conductor to energize said low impedance device.

3. In a telemetering and remote control system wherein a plurality of relatively low signal level functions are to be transmitted between a first station and a second station, and one or more low impedance devices at the second station are to be operated at occasional intervals in response to signals from the first station, the combination comprising a first conductor connecting said stations and a return path, means for applying one or more low level signals between said conductor and the return path at said second station, a first "Zener" diode having its anode connected to said conductor at said second station, a first semiconductor diode, means connecting the cathode of said first "Zener" diode to the cathode of said first semiconductor diode, a first low impedance device, means connecting the anode of the first semiconductor diode in series with said first low impedance device to the return path, a second "Zener" diode, a second low impedance device, a second semi-conductor diode having its cathode connected to said conductor at said second station and its anode connected to the anode of said second "Zener" diode the cathode of which is connected in series with said second low impedance device in the return path, said "Zener" diodes having a predetermined reverse breakdown voltage, and said semi-conductor diodes having a predetermined reverse break-down voltage, means at said first station for generating a positive pulse and a negative pulse of greater voltage magnitude than the reverse breakdown voltage of said "Zener" diodes, and means for selectively applying said pulses to said conductor to energize said low impedance devices.

4. In a telemetering and remote control system wherein a plurality of relatively low signal level functions are to be transmitted between a first station and a second station, and one or more low impedance devices at the second station are to be operated at occasional intervals in response to signals from the first station, the combination comprising a first conductor connecting said stations and a return path, means for applying one or more low level signals between said conductor and the return path at said second station, first and second "Zener" diodes, a semi-conductor diode having its anode connected to said conductor and its cathode connected to the cathode of said first and second "Zener" diodes, a first relay having normally closed contacts, first and second low impedance devices, means connecting the anode of said first "Zener" diode through said normally closed contacts of said first relay in series with said first low impedance device to said return path, a capacitor shunting said first low impedance device, means connecting the anode of said second "Zener" diode through the parallel combination of the coil of said first relay and said second low impedance device to said return path, said semi-conducter diode having a predetermined reverse breakdown voltage, and said first "Zener" diode having a reverse breakdown voltage lower than that of said second "Zener" diode, means at said first station for generating a first positive direct current pulse of magnitude greater than the reverse breakdown voltage of said first "Zener" diode but less than the reverse breakdown voltage of said second "Zener" diode, means at said first station for generating a second positive direct current pulse of magnitude greater than the reverse breakdown voltage of said second "Zener" diode, and means for selectively applying said pulses to said conductor to energize said low impedance devices, said shunt capacitor being of a value such that when said second pulse is applied, said normally closed relay contacts will open before the first low impedance device is energized sufficiently for operation.

5. In a borehole logging system wherein a plurality of relatively low signal level functions are to be transmitted between above-ground equipment and a borehole instrument assembly, and one or more low impedance devices are to be operated downhole at occasional intervals in response to signals from above-ground equipment; the combination comprising a cable conductor and a return path, a first terminal at the above-ground end portion of said conductor, a second terminal at the downhole end portion of said conductor, said instrument assembly including means for generating a direct current voltage proportional to natural gamma radiation of the formation and for impressing said voltage on said second terminal, said instrument assembly including a relay switch, an amplifier, a source of earth propagated signals, a pair of receivers spaced from said source for receiving said earth propagated signals and having outputs respectively connected to alternate contacts of said relay switch, means connecting a common contact of said relay switch to said amplifier, said common contact of said relay being alternately engaged with said alternate contacts to supply said amplifier alternately with the outputs of said receivers, a multivibrator having its output connected to the coil of said relay switch, means capacitively coupling said multivibrator to said second terminal, means above ground for generating a direct current pulse train for triggering said multivibrator, means capacitively coupling said pulse train to said first terminal, a recorder above ground for logging the direct current voltage to record the natural gamma radiation, means connecting said recorder to said first terminal, a gain step unit in said instrument assembly for changing the gain of said amplifier, a gain step relay mechanically connected to said unit and having a coil, a first "Zener" diode, a second semiconductor diode, means connecting the cathode of said first diode to said second terminal and for connecting the anode of the first diode to the anode of said second diode, means connecting the coil of said gain step relay between the cathode of second diode and said return path, said "Zener" diode having a predetermined reverse breakdown voltage, and said second diode having a predetermined reverse breakdown voltage, above ground means for generating a direct current pulse of positive polarity and of voltage magnitude greater than the reverse breakdown voltage of said "Zener" diode, and means for selectively applying said pulse to said second terminal to energize said gain step relay.

6. In a borehole logging system wherein a plurality of relatively low signal level functions are to be transmitted between above ground equipment and a borehole instrument assembly, and one or more low impedance devices are to be operated downhole at occasional intervals in response to signals from above ground equipment; the combination comprising, a cable conductor and a return path, a first terminal at the above ground end portion of said conductor, a second terminal at the downhole end portion of said conductor, a first earth formation self-potential electrode, means connecting said first electrode to said second terminal, a second earth potential electrode, an above ground amplifier having one input terminal connected to said first terminal and another input terminal connected to said second earth formation self-potential electrode, a recorder connected to the output of said amplifier for logging earth formation self-potential, said instrument assembly including a relay switch, a downhole amplifier, a source of earth propagated signals, a pair of receivers spaced from the source for receiving the earth propagated signals and having outputs respectively connected to alternate contacts of said relay switch, means connecting a common contact of said relay switch to the input of said downhole amplifier, said common contact being alternately engaged with said alternate contacts to supply the downhole amplifier alternately with the outputs of said receivers, a multivibrator having its output conected to the coil of said relay switch for operating the latter, means capacitively coupling said multivibrator to said second terminal, means above ground for generating a direct current pulse train for triggering said multivibrator, means capacitively coupling said pulse train to said first terminal, a gain step unit in said instrument assembly for changing the gain of said amplifier downhole, a gain step relay mechanically connected to said unit and having a coil, a first "Zener" diode, a second semiconductor diode, means connecting the cathode of said first diode to said second terminal and for connecting the anode of said first diode to the anode of said second diode, means connecting said gain step relay coil between the cathode of said second diode and said return path, said "Zener" diode having a predetermined reverse breakdown voltage, and said second diode having a predetermined reverse breakdown voltage, above ground means for generating a direct current pulse of positive polarity and of voltage magnitude greater than the reverse breakdown voltage of said "Zener" diode, and means for selectively applying said pulse to said second terminal to energize said gain step relay.

7. In a borehole logging system wherein a plurality of relatively low signal level functions are to be transmitted between above ground equipment and a borehole instrument assembly, and one or more low impedance devices are to be operated downhole at occasional intervals in response to signals from above ground equipment; the combination comprising, a cable conductor and a ground return, a first terminal at the above ground end portion of said conductor, a second terminal at the downhole end portion of said conductor, means for applying a first low level signal between said second terminal and the ground return, an electrical circuit connected between said second terminal and the ground return and including a semi-conductor diode, said diode having a predetermined reverse breakdown voltage substantially greater than the maximum amplitude of said first signal function, said circuit including a low impedance device energized by reverse current flow through said diode, means in the above ground equipment for generating a direct current pulse having a polarity to cause reverse current flow through said diode and having a magnitude greater than said reverse breakdown voltage, and means for selectively applying said pulse via said cable conductor to said second terminal to cause reverse current flow through the diode in order to energize said low impedance device, thereby permitting said cable conductor to serve both for transmission of said first signal function between said above ground equipment and said borehole instrument and for transmission of said pulse from said above ground equipment to said borehole instrument.

8. The apparatus defined by claim 7 wherein said circuit includes a second diode connected in series with said semi-conductor diode and poled in the opposite direction, and means connecting said low impedance device in series with said semi-conductor diode and said second diode.

9. The apparatus defined by claim 7 wherein said low impedance device comprises a switching device, and means controlled by said switching device for altering said low level signal function.

10. The apparatus defined by claim 8 wherein said low impedance device comprises a switching device, and means controlled by said switching device for altering said low level signal function.

11. The apparatus defined by claim 7 wherein said first low level signal function is a unidirectional signal and said semi-conductor diode is poled in the reverse direction for said unidirectional signal.

12. The apparatus defined by claim 11 wherein said low impedance device comprises a switching device, and means controlled by said switching device for altering said low level signal function.

13. The apparatus defined by claim 9 wherein the low level signal function is derived from the output of a gamma ray counter and detector in the borehole instrument and wherein the controlled means comprises an amplifier, a source of earth propagated signals located in the borehole instrument, a receiver spaced from said source for detecting said earth propagated signals, means connecting said amplifier to said receiver, and means for altering the gain of said amplifier.

14. The apparatus defined by claim 10 wherein the low level signal function is derived from the output of a gamma ray counter and detector in the borehole instrument and wherein the controlled means comprises an amplifier, a source of earth propagated signals located in the borehole instrument, a receiver spaced from said source for detecting the earth propagated signals, means connecting said amplifier to said receiver, means for altering the gain of said amplifier.

15. The apparatus defined by claim 15 further including first and second receivers carried in spaced apart positions in the borehole instrument, means for alternately connecting the amplifier to said first and second receivers, the last named means including a switch connected to said second terminal and operated by a second relatively low signal function transmitted from the above ground equipment via said cable conductor to said second terminal, means for applying said second relatively low signal function to said cable conductor, said second signal function having a maximum amplitude less than the reverse breakdown voltage of said semi-conductor diode.

16. The apparatus defined by claim 14 further including first and second receivers carried in spaced apart positions in the borehole instrument, means for alternately connecting the amplifier to said first and second receivers, the last named means including a switch connected to said second terminal and operated by a second relatively low signal function transmitted from the above ground equipment via said cable conductor to said second terminal, means for applying said second relatively low signal function to said cable conductor from the above ground equipment, said second signal function having a maximum amplitude less than the reverse breakdown voltage of said semi-conductor diode.

17. The apparatus defined by claim 9 wherein the first low level signal is a natural earth potential derived from the difference of potential between an electrode in the borehole instrument and a remote electrode and wherein the controlled means comprises an amplifier, a source of earth propagated signals located in the borehole instrument, a receiver spaced from said source for detecting said earth propagated signals, means connecting said amplifier to said receiver and means for altering the gain of said amplifier.

18. The apparatus defined by claim 17 further including first and second receivers carried in spaced apart positions in the borehole instrument, means for alternately connecting the amplifier to the said first and second receivers, the last named means including a switch connected to said second terminal and operated by a second relatively low signal function transmitted from the above ground equipment via said cable conductor to said second terminal, means for applying said second relatively low signal function to said cable conductor from the above-ground equipment, said second signal function having a maximum amplitude less than the reverse breakdown voltage of said semi-conductor diode.

19. The apparatus defined by claim 8 wherein another circuit is connected between said second terminal and said ground return and includes a pair of series connected, oppositely poled diodes and another low impedance device, one of the diodes of said pair being poled in the forward direction to said pulse and the other diode of said pair being poled in the reverse direction to said pulse and having a substantially greater reverse breakdown voltage than said one diode, and means for selectively supplying a D.C. voltage from the above ground equipment via said cable conductor to said second terminal having a polarity and amplitude to cause reverse current flow through said one diode and having an amplitude insufficient to cause reverse breakdown of said second diode, thereby to energize said another low impedance device.

20. The apparatus defined by claim 8 wherein said circuit includes a third diode connected in series with said semi-conductor diode and poled in the same direction, said low impedance device being connected in series with said semi-conductor diode and said third diode, a relay having an operating coil connected in said circuit to be energized by reverse current flow through said semi-conductor diode, another circuit connected in shunt with the series connected coil, third diode and semi-conductor diode, said another circuit including another diode poled in the reverse direction to said pulse and connected in series with another low impedance device, said another circuit including normally closed contacts of said relay connected in series with said another semi-conductor diode, said pulse having a magnitude sufficient to cause reverse breakdown of said third diode and said semi-conductor diode, and means for selectively supplying a D.C. voltage to said second tremimal from the above ground equipment via said cable conductor having a polarity and magnitude sufficient to cause reverse breakdown of said another diode but insufficient to cause reverse breakdown of said third diode and said semi-conductor diode, whereby application of said D.C. voltage is effective to energize said another low impedance device while application of said pulse to said second terminal is effective to energize said relay and the low impedance device connected in series therewith, said relay when energized being effective to open the normally closed contacts to prevent energization of said another low impedance device.

21. The apparatus defined by claim 20 wherein means including a capacitor is connected across said another low impedance device and effective when said pulse is applied to said second terminal to prevent energization of said another device for a period of time sufficient to energize said relay, whereby said normally closed contacts will open before said another low impedance device can be energized by reverse current flow through said another doide.

22. In a borehole logging system wherein a plurality of relatively low signal level functions are to be transmitted between above ground equipment and a borehole instrument assembly, and one or more low impedance devices are to be operated downhole at occasional intervals in response to signals from above ground equipment; the combination comprising a cable conductor and a return connection, a first terminal at the above ground end portion of said conductor, a second terminal at the downhole end portion of said conductor, first and second electrical circuits connected between said second terminal and the return connection and respectively including first and second semi-conductor diodes each conducting reverse current in response to a voltage in excess of a predetermined reverse breakdown voltage, means including an additional diode in said first circuit for controlling current flow through said first circuit, means in the above ground equipment for generating first and second voltages, the first of which is effective to cause current flow through said first circuit in the direction of reverse current flow through said first diode and the second of which is effective to cause current flow through the second circuit in the direction of reverse current flow through said second diode, and means for selectively applying said first and second voltages to said first terminal and via said cable conductor to said second terminal.

23. The apparatus defined by claim 22 wherein said additional diode is poled in the opposite direction from said first semi-conductor diode.

24. The apparatus defined by claim 22 further including a low impedance switching device in at least one of said circuits operated by reverse current flow through the latter circuit.

25. The apparatus defined by claim 22 further including means for applying a low level signal function between said second terminal and said ground return, said low level signal function being ineffective to cause reverse current flow through either of said first and second circuits, thereby permitting said cable conductor to serve both for transmission of said signal function between said above ground equipment and said borehole instrument and for transmission of said first and second voltages from said above ground equipment to said borehole instrument.

26. The apparatus defined by claim 22 wherein said second circuit includes a further diode connected in series with the second semi-conductor diode and oppositely poled with respect thereto, said further diode having a substantially greater reverse breakdown voltage than said second semi-conductor diode.

27. The apparatus defined by claim 22 wherein said first circuit includes a relay having an operating coil connected in said first circuit to be energized by reverse current flow through said first semi-conductor diode, said second circuit including normally closed contacts of said relay connected in series with said second semi-conductor diode, said first voltage having a magnitude sufficient to cause reverse breakdown of said first semi-conductor diode to energize said relay, said relay when energized being effective to open the normally closed contacts to prevent current flow through said second circuit.

References Cited by the Examiner

UNITED STATES PATENTS

| 2,408,001 | 9/46 | Shimek | 340—15 |
| 2,732,518 | 1/56 | Bricaud | 340—18 |
| 2,876,434 | 3/59 | Oberlin | 340—18 |
| 2,905,885 | 9/59 | Burt | 307—88.5 |
| 2,949,544 | 8/60 | Hill | 307—88.5 |
| 2,976,520 | 3/61 | Reenstro | 340—172 |

OTHER REFERENCES

Graphical Symbols for Electronic and Electrical Diagrams, Part I, Military Standard, MIL–STD–15–1, October 30, 1961; page 34 (section 73.93) relied on.

SAMUEL FEINBERG, *Primary Examiner.*

CHESTER L. JUSTUS, IRVING L. SRAGOW, EVERETT R. REYNOLDS, *Examiners.*

---

UNITED STATES PATENT OFFICE

CERTIFICATE OF CORRECTION

Patent No. 3,187,301            June 1, 1965

Gerald C. Summers

It is hereby certified that error appears in the above numbered patent requiring correction and that the said Letters Patent should read as corrected below.

Column 7, line 74, before "first" insert -- a --; column 9, line 21, for "emplifier" read -- amplifier --; column 10, line 11, after "said" insert -- downhole --; line 12, strike out "downhole"; column 11, line 19, before "means" insert -- and --; line 21, for the claim reference numeral "15" read -- 13 --; column 12, line 46, for "doide" read -- diode --.

Signed and sealed this 22nd day of February 1966.

(SEAL)
Attest:

ERNEST W. SWIDER            EDWARD J. BRENNER

Attesting Officer            Commissioner of Patents

UNITED STATES PATENT OFFICE
CERTIFICATE OF CORRECTION

Patent No. 3,187,301                                  June 1, 1965

Gerald C. Summers

It is hereby certified that error appears in the above numbered patent requiring correction and that the said Letters Patent should read as corrected below.

Column 7, line 74, before "first" insert -- a --; column 9 line 21, for "emplifier" read -- amplifier --; column 10, line 11, after "said" insert -- downhole --; line 12, strike out "downhole"; column 11, line 19, before "means" insert -- and --; line 21, for the claim reference numeral "15" read -- 13 --; column 12, line 46, for "doide" read -- diode --.

Signed and sealed this 22nd day of February 1966.

(SEAL)
Attest:

ERNEST W. SWIDER                                    EDWARD J. BRENNER
Attesting Officer                                      Commissioner of Patents